March 9, 1965 T. F. PETERSON 3,172,931
METHOD OF MAKING CONDUIT UTILIZING HELICALLY PREFORMED ELEMENTS
Original Filed Sept. 30, 1957
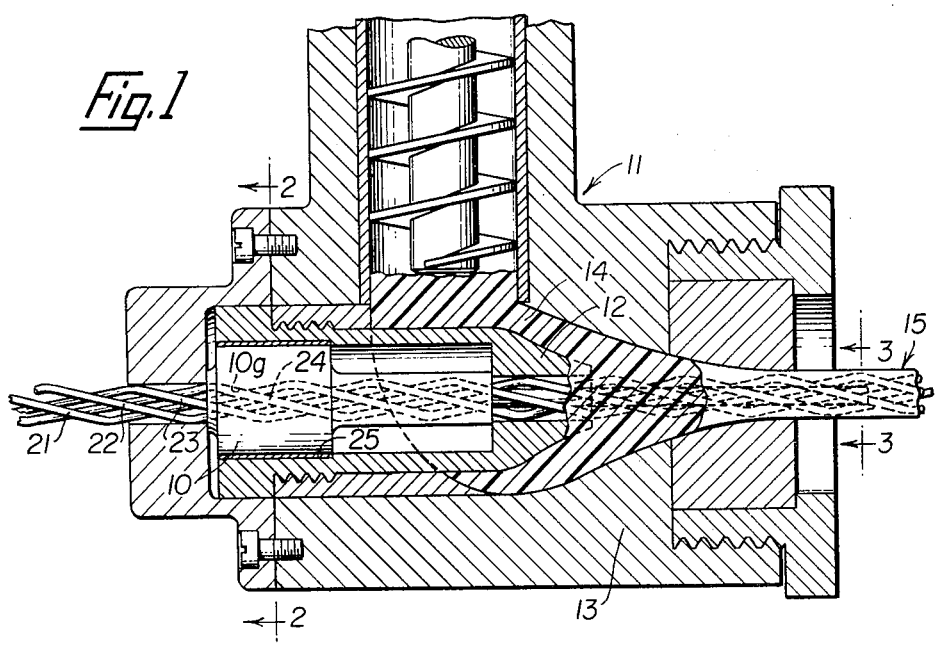
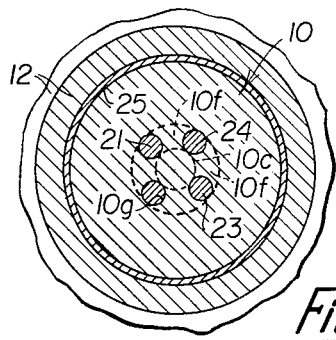
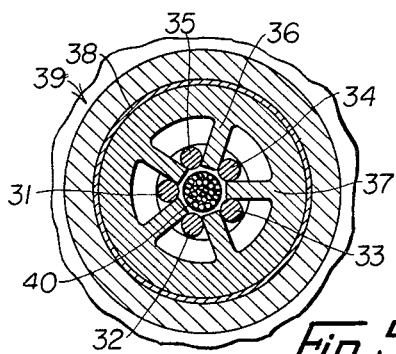
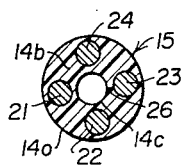
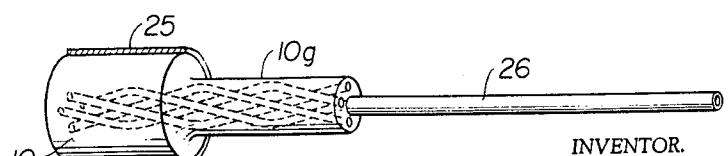
INVENTOR.
THOMAS F. PETERSON
BY Richard H. MacCutcheon
ATTORNEY

United States Patent Office 3,172,931
Patented Mar. 9, 1965

3,172,931
METHOD OF MAKING CONDUIT UTILIZING
HELICALLY PREFORMED ELEMENTS
Thomas F. Peterson, 23450 Laureldale Road,
Shaker Heights, Ohio
Original application Sept. 30, 1957, Ser. No. 687,218, now
Patent No. 3,086,557, dated Apr. 23, 1963. Divided
and this application July 24, 1962, Ser. No. 212,006
3 Claims. (Cl. 264—173)

This application is a division of my co-pending patent application, Serial No. 687,218, filed September 30, 1957, and the present invention relates to improvements in methods of making tubular conduit or sheathing, and has particular significance in connection with flexible armor for electric cables and fluid conduits.

Heretofore "BX cable" has been well known and comprises cable having an outer insulation with armor to protect against abrasion and mechanical damage. The armor takes the form of a helically wound tape overlapping at the edges or helically wound tapes overlapped one to the other. Since the turns separate at the edges upon flexing, and so permit entry of water, oil and the like, a gasket is generally included and confined between inturned edges of the wound tape but even so seepage is not positively prevented particularly since the gasket material wears with use and decomposes with age. While it has heretofore been proposed to roll deeply corrugated tapes so that the overlapping edges can be soldered or welded and the necessary flexures supplied by the side walls, such a construction is generally not feasible for cable armor where the cable diameter must be limited to the smallest possible dimensions, and such a construction, as well as the BX construction, has the disadvantage that the metal of the outer armor is subject to corrosive influences. In modern chemical plants, for example, electrical cable design, and fluid pipe design as well, poses many serious engineering problems. Acids, alkalies, alcohols, chlorine fumes and other chemicals can corrode, dissolve or embrittle most insulating, jacketing and armoring materials with resultant failure in service, or, in some cases and in some atmospheres, with a resultant serious explosion.

Heretofore, it has been known to merely wrap various materials to make tubes or conduit or cable jacketing. For example, cable sheath has been built up by wrapping paper tape with openings between laps and then applying a thermoplastic layer of polyethylene over and forcing it between the laps of the open butt taped paper tape. Flexible hose has been formed by merely wrapping plastic coated metal tape upon a mandrel. Resinous-treated fabric has been wound to form a tubing. Superimposed strips of plastic material have been wound with a reinforcing material interposed between superimposed layers. Preformed mono-material elements touching one another have been used as outer armor, but, so far as I know, all of the prior art means fail to adequately protect against internal pressures, outer corrosions, inner corrosions, aging of outer material, and wrinkling of outer material with bending, and often fail to provide adequate longitudinal strength.

It is an object of the present invention to provide a simple and inexpensive method for overcoming the above mentioned difficulties.

Another object of the invention is to provide a flexible tubular structure characterized by absolute sealing against ingress or egress of substances and at the same time offering adequate protection against corrosive influences while mechanically strengthened by metallic elements which develop unusual longitudinal strength for such structure.

Another object is to produce a flexible pipe having a corrosion resistance greater than that of metal and a bursting strength greater than that of so-called plastic material.

Another object is to provide articles and methods assuring cable, conduit or tube structure with improved corrosion resistance combined with adequate protection against bursting, aging or wrinkling.

Other objects and advantages will become apparent and the invention may be better understood from consideration of the following description taken in connection with the accompanying drawing, in which:

FIG. 1 is a side elevational section of a form of apparatus for producing improved metal reinforced corrosion resistant tubular structure according to the present invention;

FIG. 2 is a cross-section taken along the line 2—2 of FIG. 1;

FIG. 3 is a cross-section of the completed product as viewed along the line 3—3 of FIG. 1;

FIG. 4 is a perspective view showing the preformed element separating rotatable member 10 of FIGS. 1 and 2;

FIG. 5 is a cross-section showing a modified form of preformed element separating rotatable member, and with the invention applied to produce outer jacketing for an electric cable.

The present application has its basis, in part, in my invention or discovery that mere wrapping as of metal reinforcing strips affords low resistance to internal pressure, leads to failure of any outside plastic to have compression stresses important to resist such internal pressure and to help the aging properties of the plastic, provides low resistance to wrinkling or balling-up of outside plastic, and, like a door spring, provides little strength longitudinally.

According to one aspect of the present invention, sealing without objectionable interference with flexure is attained by surfacing plural "helically preformed" turns of metal tapes or rods completely with a thermoplastic, so surfaced as to "plastic-weld" the turns together. By this means adequate and elastic and "shear" sealing between turns and protection about the turns can be had with round or even flat metal tape without preshaping as required for "BX," and thus with cable or tube diameter held at a minimum, while adequate pitch and direction of the plural preformed elements will provide great strength longitudinally as well as radially.

The preformed metal elements, because of past usage, may be referred to as "armor rods," and they are already available in the trade in complete sets (of inter-touching elements). If such a set is used, then, in accordance with the present invention, one or more elements are removed to leave less than a full set and next as with a wheel of inwardly extending radial fingers, or with some other means, the remainder of the elements of the set are prevented from touching one another, while they are surrounded with plastic, so that as an end result the elements are solidly held together by resilient means, and though viewed in cross-section they will be circumferentially spaced one from the other, they will provide a construction having a bursting strength and even a longitudinal strength limited only by the mechanically strong preformed elements.

Referring first to FIG. 1, apparatus which may be used in practicing my invention may consist of a rod spacing rotatable member 10 located in an extrusion device 11 which has a nozzle 12 and a female die 13 between which plastic material 14 at high temperature and pressure is extruded to form the final product which in this case is tubing 15 (see FIG. 3).

In accordance with the present invention, I take less than a "full set" of preformed armor rods, or helically preformed tapes, comprising elements preformed each in an open helix having a pitch several times the diameter of the helix and an opening between turns sufficient to permit the appplication of each element, for example to a bundle of like elements, from the side, somewhat as disclosed and described in my Patents 2,275,019, and 2,587,521, except that in accordance with the present invention the preformed elements, preferably metallic, are less than a full set, and separated, and thereafter covered with a thermoplastic material as in apparatus according to FIG. 1. Presupposing that a full set comprises eight or nine armor rods, four or five may have been removed to leave four, such as the armor rods 21, 22, 23, and 24 shown in FIGS. 1–5. These are introduced into one end of the extrusion apparatus, and into helical grooves 10g in the rotatable member 10 which preserves equal spacing between rods, the wheel-like member 10 being free to revolve, for example with the bearing material 25 providing an annular and thrust bearing surface between member 10 and adjacent portions of nozzle 12. The force of the extrusion of the plastic material 14 causes the rods 21–24 to advance through the extrusion apparatus, and causes consequent turning of the rotatable member 10 which, therefore, need not be power-driven. A center portion 10c (see FIG. 2) of the member 10 preserves concentricity of the partial set of armor rods and thereafter a reduced diameter central tube or rod 26 (see FIGS. 3 and 4) provides a central male die portion to assure that thermoplastic material will be placed between the inner diameter of the partial set of armor rods and the prospective inner diameter of the tube 15 as finally produced. This portion 26 is preferably rotatable with respect to rotatable member 10 while having a thrust collar (not shown) internally of member 10 so that 26 may remain stationary while 10 revolves.

It is, of course, not necessary to take a full set of preformed rods and then remove some, for it is only necessary to use so many elements as are needed. Thus, elements might have been separately preformed and stored individually upon reels which then all fed into a twister apparatus or stranding head for forming the loose tube of preformed elements, and then the twister apparatus may feed the loose tube immediately and continuously into extrusion apparatus of the type shown in FIG. 1.

The plastic material 14 may comprise a normally solid polyethylene or other thermoplastic resinous material such as polyvinyl chloride, nylon, Teflon or methyl-methacrylate. Rubber is not quite so satisfactory, as it ages, and thermosetting resins do not seem suitable. While most any resin, particularly if having reinforcing to strengthen it, might be used, polyethylene may be preeminent for the purpose because it has a high dielectric strength, is chemically inert to most materials, will not absorb liquids, has superior mechanical properties, can be used to provide a continuous coating on a metal such as steel without degradation of the plastic, particularly when a carbonaceous material such as graphite or carbon black (about 0.5%) is included as a filler, and because it leaves a flexible coating capable of 50% elongation so that not only will the finished tube be flexible when completed, but deformation during extrusion will be well within permissible limits.

Within the province of the present invention, the plastic might be applied upon the preformed elements in manner other than by extruding, as by molding, or flame spraying, or dipping, or it may be "wiped on" (with suitable temperature controls) to any desired thickness, but some means such as the member 10 will be required in order to separate the preformed elements so that the plastic material can be interposed between them thus to provide elastic deformation and tensile elongation whenever the tube is bent during use.

FIG. 2 is a section along the line 2—2 showing the elements 21–24 separated by helically extending grooves 10g provided between fingers 10f in the rotatable member.

In FIG. 3 it is seen that the end product has outer corrosion resistance provided by outer plastic 14o, and inner corrosion resistance provided by inner plastic 14c, as well as plastic 14b between the preformed elements which provide a bursting strength limited only by the mechanically stronger preformed elements which have great advantages over metallic elements wrapped into or upon insulated assemblies according to the prior art, in that structures according to the present invention are made straight, and the preformed elements (particularly if an "open" set of four or more are used) will extend much more longitudinally than would wound-on metallic elements which could open-up between turns. The resultant longitudinal component of strength afforded by the invention can be readily increased by providing more preformed elements in an assembly, or by increasing the pitch of each.

In the modification of FIG. 5, five preformed elements 31–35 are shown, and here they are separated by simple teeth or spokes 36 extending inward as part of a radial comb or wheel structure 37 free to revolve, in or with bearing material 38, with respect to the rest of extrusion structure indicated generally at 39. With the arrangement in FIG. 5 there is shown a central electric cable structure comprising a plurality of inter-insulated conductors 40, and the end result is that according to the present invention there is provided outer jacketing for cable structure, chemically inert to most materials, non-liquid absorbing, with superior mechanical properties, particularly as regards longitudinal stresses. Thus with the invention, unlike most conventional constructions, there is no problem of breakage of walls, a fact which becomes of particular importance in hazardous atmospheres or wherever the constructions are used for fluid conduits. Where a material such as polyethylene is used there is provided a natural resistance to acid and alkaline attacks as well as superior mechanical properties easily capable of withstanding any bending "shear" apt to be imposed.

Thus, my improved method of construction comprises simply obtaining (or preforming) long metal elements each preformed to an open helix having a pitch and opening between turns, thereafter pushing or pulling or holding stationary an assembly of more than one of said preformed metal elements with respect to means to separate them, and applying a plastic material around and between the turns. If the final structure is to be a tube, it is preferable to apply the plastic so it will also cover an inner periphery within the turns. If the structure is intended as outer jacketing for electric cable, it may, in some instances, be preferable to preform the metal elements to a diameter less than the existing diameter of cable to be covered so that they will always exert pressure on the outer coating; or tubular structure of the invention whether intended as a final conduit or as outer covering for cable could be formed over a tubular core to which the webs (and thus the outer plastic) will be bonded whether by temperature, by gluing or by "shrinking on." Even for covering cable, a hollow tube form of member 26 might be used with the cable passing through it and then the element 26 "left behind" as preformed element reinforced plastic coating "shrinks-on" to closely adhere to the cable.

There are thus provided methods of the character described capable of meeting the objects above set forth. The thermoplastic is easy to apply because of the low temperatures involved. The metal elements which are preformed may be of any desired cross-section, rectangular, round, square, elliptical, as desired, and because turns as of plastic coated metal were never merely wrapped on and then sealed, there is developed a higher longitudinal strength and higher resistance to internal pressure than known to the prior art, as well as increased resistance to wrinkling or balling-up of outside plastic, and also development of compression stresses which improve the bursting and aging properties of the plastic.

While I have illustrated and described particular embodiments, various modifications may obviously be made without departing from the true spirit and scope of the invention, which I intend to define in the appended claims.

I claim:

1. The method of making a reinforced tubular structure which comprises preforming each of a plurality of elongated form-maintaining metallic elements into a helix having a pitch greater than the diameter of the helix, arranging said elements in circumferentially equidistantly spaced coaxial relation by passing them through a rotatable member cooperating with the elements to form of them a skeletonized open tubular assembly, advancing said assembly to rotate said member and simultaneously advancing the assembly axially through a body of settable plastic composition confined peripherally in a chamber about the assembly, and extruding the assembly from the chamber with the spaces between the elements filled with the plastic.

2. The method of making a reinforced tubular structure which comprises preforming each of a plurality of elongated form-maintaining metallic elements into a helix having a pitch greater than the diameter of the helix, later arranging said elements with a holding means through which they may axially advance while held in circumferentially equidistantly spaced coaxial relation with the elements cooperating to constitute a skeletonized tubular assembly, rotating the holding means by simultaneously advancing each assembly portion axially through and out of the holding means and then through a body of settable plastic composition confined peripherally in a chamber about the assembly, and extruding the assembly from the chamber with the preformed form-maintaining elements embedded in the plastic.

3. The method of making a reinforced tubular structure which comprises preforming each of a plurality of elongated form-maintaining metallic elements into a helix having a pitch of the order of several times the diameter of the helix, next arranging said elements within the confines of a rotatable element separating member in circumferentially spaced coaxial relationship with the elements cooperating to constitute a skeletonized open tubular assembly, advancing said assembly through said member thus rotating said member and meanwhile advancing said assembly therethrough and through a chamber having an outlet orifice of larger diameter than the assembly and around a mandrel of smaller diameter than the assembly while forcing a settable plastic composition into the chamber around the assembly and therewithin around the mandrel and out through the orifice and simultaneously advancing the assembly out through the orifice in embedded relationship with plastic in the orifice so as to discharge from the orifice a plastic tubular structure reinforced with embedded helically preformed metallic elements.

References Cited in the file of this patent

UNITED STATES PATENTS

| 9,989 | Clark | Dec. 7, 1881 |
| 699,458 | Dover | May 6, 1902 |
| 1,553,362 | Calcutt | Sept. 15, 1925 |
| 2,563,397 | Colombo | Aug. 7, 1951 |
| 2,778,059 | Henning et al. | Jan. 22, 1957 |